Patented July 3, 1951

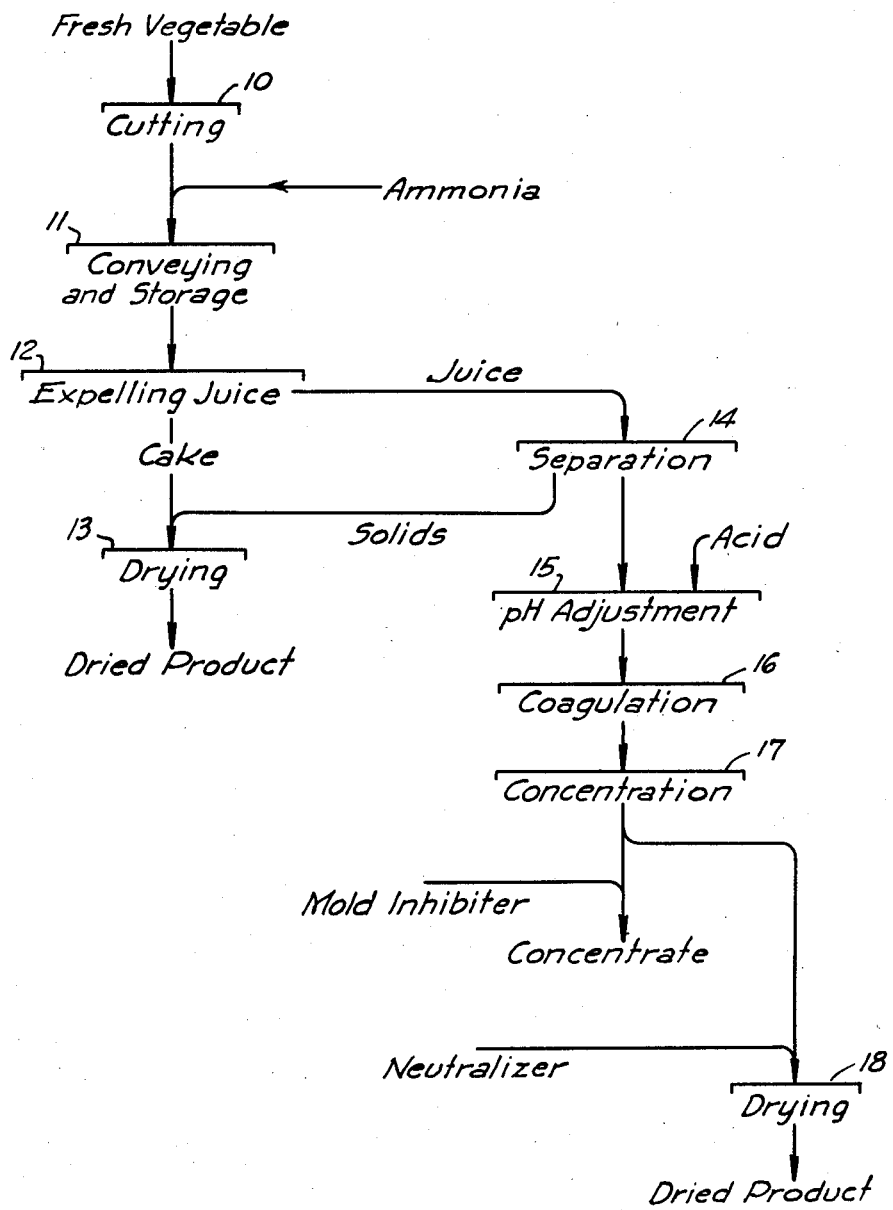

2,559,459

UNITED STATES PATENT OFFICE 2,559,459

VEGETABLE TREATMENT PROCESS

David D. Peebles, Hillsborough, Paul D. Clary, Jr., Petaluma, and Richard K. Meade, Santa Rosa, Calif., assignors to Western Condensing Company, San Francisco, Calif., a corporation of California Application February 1, 1949, Serial No. 73,934

3 Claims. (Cl. 99—204)

This invention relates generally to processes for forming marketable products from various vegetable materials, particularly the green leafy portions of succulent plants, such as alfalfa, grasses, beet tops and the like, and to products resulting from such processes.

The leafy portions of succulent vegetables like alfalfa contain a substantial amount of carotin, and it is recognized that the food value of products made from such materials is dependent to a substantial degree upon the residual carotin content. It has been observed that almost immediately after cutting fresh green alfalfa in the field, the carotin content commences to deteriorate, presumably due to oxidation. When this material is brought to a processing plant and dried by conventional methods, the carotin content at the commencement of processing shows substantial deterioration over the original material, and during processing further deterioration occurs until in a typical instance the carotin content immediately after processing will be of the order of 65% of the original amount present. After conventional drying the carotin content continues to fall off rapidly during storage, so that when storage is extended over a period of say three months, the carotin content in a typical instance will be of the order of 50% of the original amount present.

In general it is an object of the present invention to provide a process for the treatment of green vegetable materials, such as alfalfa and the like, which serves to protect the alfalfa against deterioration of the carotin content which tends to occur immediately after the alfalfa has been cut, and particularly for the period between cutting of the alfalfa and the processing of the same.

Another object of the invention is to provide a process for the treatment of green vegetable material which will serve to preserve a substantial amount of the carotin content in the form of a concentrate, so that it is available for separate marketing.

Additional objects of the invention will appear from the following description in which the preferred embodiment has been set forth in detail in conjunction with the flow sheet of the accompanying drawing.

The features of our invention can best be understood after a description of the flow sheet of the accompanying drawing. Step 10 represents the cutting of the fresh vegetable material in the field, such as alfalfa, grasses, beet tops and the like. Immediately after cutting, it is contacted with a material capable of exerting a preserving action upon the carotin content. In the flow sheet the material is shown being contacted with an ammonia-water solution, or other preserving materials can be utilized as will be presently explained. Assuming that an ammonia-water solution is being used, the alfalfa can be sprayed with this solution while it is being conveyed from the cutting means to the truck or other vehicle being used to transport the material to the processing plant. Where a chopping operation is being carried out in the field, the ammonia solution can be sprayed on the chopped material as it is being pneumatically or otherwise conveyed from the chopper to the truck.

Step 11 represents transporting the material from the field to the processing plant, where it may be stored a short time before actual processing. Following such preliminary storage the material is subjected to processing for producing certain marketable products. If chopping has not been carried out in the field the material may be reduced in size by a chopping operation, after which a substantial amount of the juice is expressed by the expelling operation 12. This operation can be conveniently carried out by the use of a feed screw type of continuous expeller, which subjects the material to relatively high mechanical pressure for forcing out a substantial amount of the juice. It is desirable to use two serially connected expellers for this purpose, with the second expeller being heated to heat the material to a temperature of the order of 212° F.

The press cake from the operation 12, which may contain from 60% to 70% moisture, is shown passing to the drying operation 13, which can be carried out by the use of conventional drying apparatus to produce a final dried product.

The juice from operation 12 contains a substantial amount of the carotin content, together with vegetable protein, and other soluble solids. It is shown passing to a suitable separating operation 14 for removal of the readily separable solids, which are then returned to the process for drying at 13. In step 15 the hydrogen ion concentration of the juice is adjusted by the addition of a suitable acid, such as sulphuric acid or the other acids presently mentioned. It is desirable to add sufficient acid at this point to reduce the hydrogen ion concentration to at least about pH 5.5, and good results are secured by adjustment of the hydrogen ion concentration between the limits of from pH 4.0 to 5.5. Following adjustment of the hydrogen ion concentration, the material is subjected to a coagulating operation 16, which is carried out by heating the material to an elevated temperature. It is desirable that the material be heated at least to a temperature of the order of about 160° F., and in general temperatures ranging from 160° F. to 212° F. can be employed. The use of higher acid concentrations enables use of lower temperatures. The coagulating operation serves to coagulate vegetable protein as a finely divided precipitate.

Following coagulation the material is concentrated at 17 as by vacuum evaporation, to produce a concentrate containing say 25% to 30% solids. In conjunction with concentration the hydrogen ion concentration is adjusted to a lower value of from pH 3.0 to 3.5. This product, without further treatment, is of itself a marketable product. It is desirable to add small amounts of a suitable mold inhibiter to this material, as for example small amounts of propionic acid.

Instead of selling all or a part of the material as a concentrate, it is possible to take the concentrate from operation 17 and subject the same to a conventional drying operation 18, as for example by the use of suitable spray drying equipment, to produce a stable dry product.

With respect to treatment of the freshly cut alfalfa prior to subsequent processing, we have discovered that the rapid deterioration of the carotin content normally experienced after field cutting of alfalfa, can be greatly diminished by contacting the freshly cut material with dilute ammonia solution. This serves in some manner to inhibit such changes as cause the carotin content to deteriorate, including such changes as are commonly attributed to enzymic activity. Dilute ammonia solution containing say 2% ammonia in water can be sprayed upon the freshly cut alfalfa, and good results are obtained by employing about 200 lbs. of such solution for each ton of green alfalfa. The hydrogen ion concentration of the alfalfa, after treatment with the ammonia solution is slightly on the alkaline side, such as from say pH 7.5 to 8.5.

It is generally desirable to prepare the dilute ammonia solution by the dilution of commercial aqua ammonia with water. It is possible, however, to prepare the solution by the dissolution of ammonia gas in water to produce a suitable dilute solution. Also solutions of ammonia forming compounds, such as ammonium chloride and ammonium sulphate can be reacted with caustic solutions such as a solution of sodium hydroxide, to form a suitable aqueous solution of ammonium hydroxide.

It is possible in some instances to eliminate the chopping of the alfalfa, particularly where it is desirable to provide a product from the drying operation 13 which is not finely divided.

The acidulating operation 15 can be carried out substantially simultaneously with heating the material in operation 16, to coagulate vegetable protein. Coagulation of the vegetable protein aids in ultimate stabilization of the carotin content in either the concentrate from 16, or the dried product from 18. It also greatly facilitates a spray drying operation at 18. In place of sulphuric acid it is possible to use acids such as hydrochloric, lactic, phosphoric and acetic.

In general our process produces marketable by-products from fresh vegetable materials like alfalfa, with a minimum loss of carotin prior to and during processing. In a typical instance the dried material from operation 13 will contain 50% of the original carotin content, and 40% will be contained in the concentrate from operation 17. Upon drying this concentrate 40% of the original carotin content will be found in the final spray dried material. The dried material from operation 13 can be readily sold as a stock food or for mixture with other stock feed materials. The concentrate from operation 17 or the dried material from 18 can be sold as a concentrated source of carotin for mixture with other feed materials, as for example for mixture with the dried material from operation 13.

We claim:

1. In a process for the treatment of fresh vegetable material, expelling a substantial amount of juice from the material by applying pressure to the same, coagulating vegetable protein contained in the juice by acidulating and heating the same, and then removing moisture from the coagulated protein and juice to form a marketable product.

2. In a process for the treatment of fresh vegetable material, subjecting the material to mechanical pressure to expel a substantial amount of juice from the same, coagulating vegetable protein of the juice by acidulating and heating the same, concentrating the resulting juice by evaporation, neutralizing the remaining concentrate, and then drying the concentrate to form a dried product.

3. In a process for the treatment of fresh green vegetable material, cutting the material in the field, immediately thereafter contacting the cut material with ammonia to preserve the carotin content, subjecting the material to mechanical pressure to expel a substantial amount of juice from the same, coagulating vegetable protein of the juice by acidulating and heating the same, and then concentrating the resulting juice by evaporation.

DAVID D. PEEBLES.
PAUL D. CLARY, JR.
RICHARD K. MEADE.

REFERENCES CITED

The following references are of record in the file of this patent:

UNITED STATES PATENTS

| Number | Name | Date |
|---|---|---|
| 1,935,754 | Virtanen | Nov. 21, 1933 |
| 2,078,537 | Henglein et al. | Apr. 27, 1937 |
| 2,213,127 | Kerschbaum et al. | Aug. 27, 1940 |
| 2,311,316 | Souther | Feb. 16, 1943 |
| 2,334,059 | Bauer | Nov. 9, 1943 |
| 2,346,072 | Haskell | Apr. 4, 1944 |
| 2,353,333 | Harris | July 11, 1944 |